Feb. 13, 1940.   H. K. RICHARDSON   2,190,296
GUIDE FOR MOLTEN MATERIAL
Filed Aug. 27, 1938   2 Sheets-Sheet 1
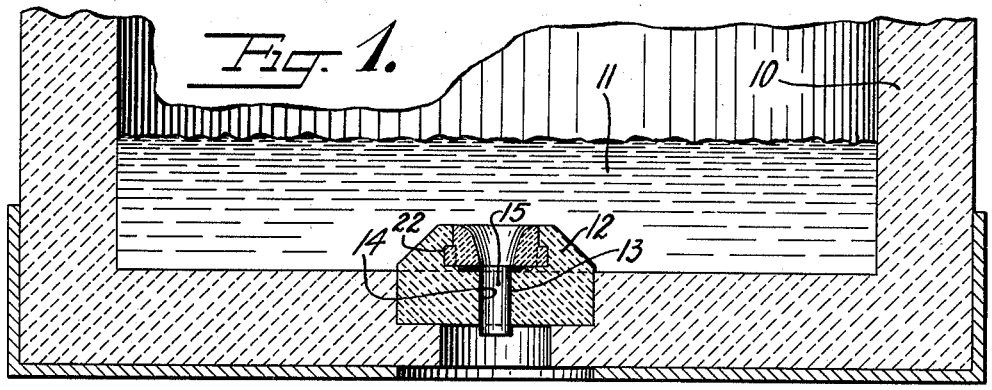
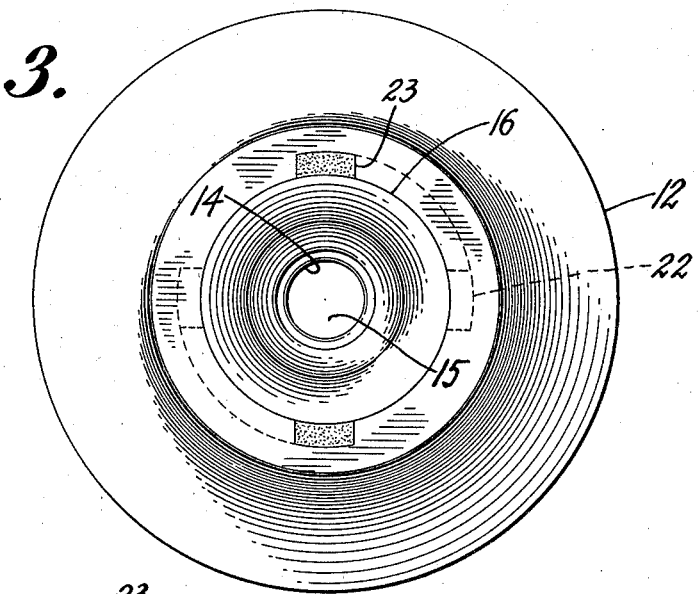
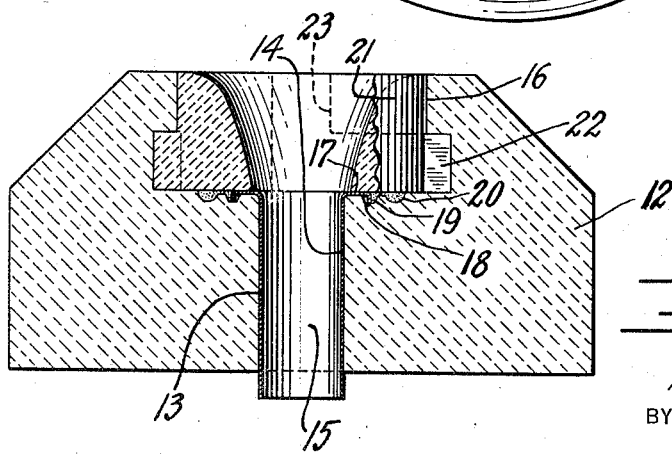
INVENTOR
H. K. RICHARDSON
BY
ATTORNEY Feb. 13, 1940.   H. K. RICHARDSON   2,190,296
GUIDE FOR MOLTEN MATERIAL
Filed Aug. 27, 1938    2 Sheets-Sheet 2
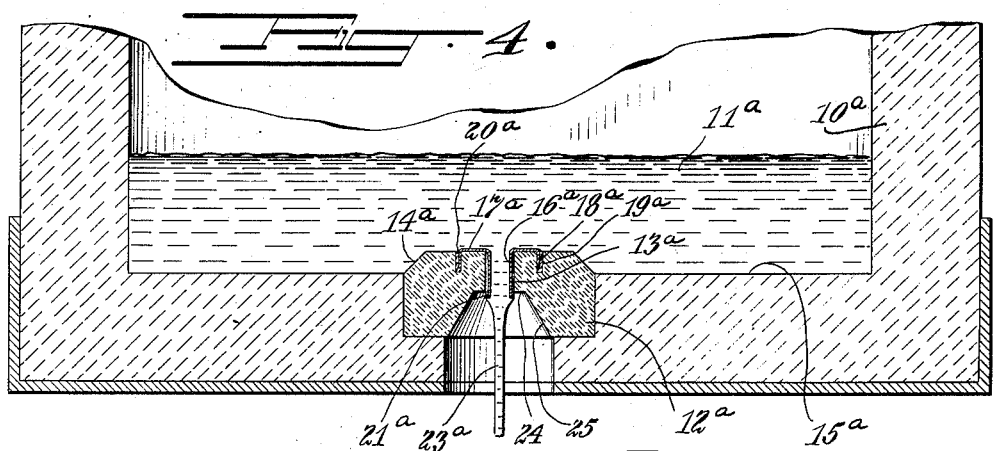
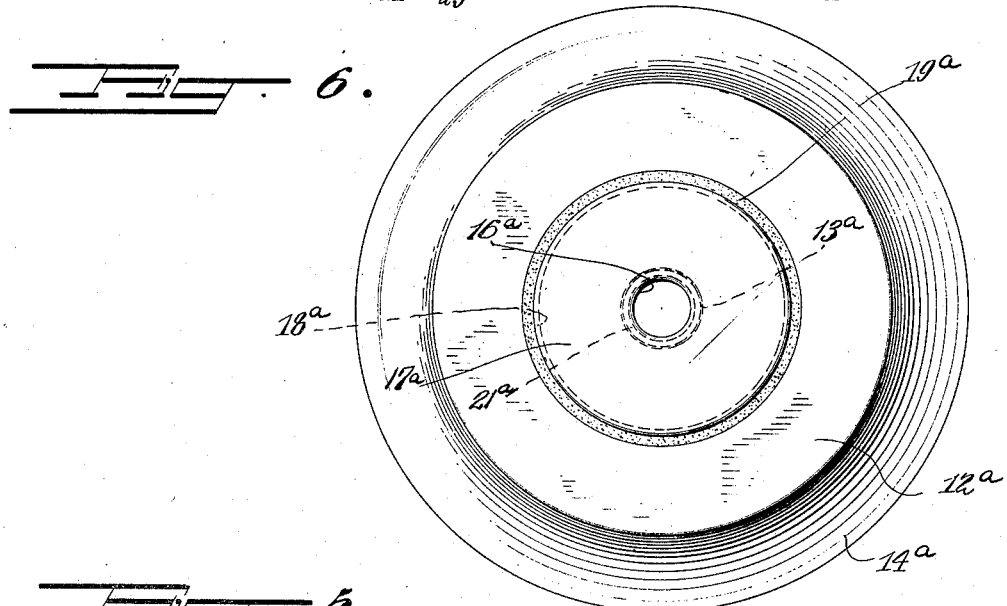
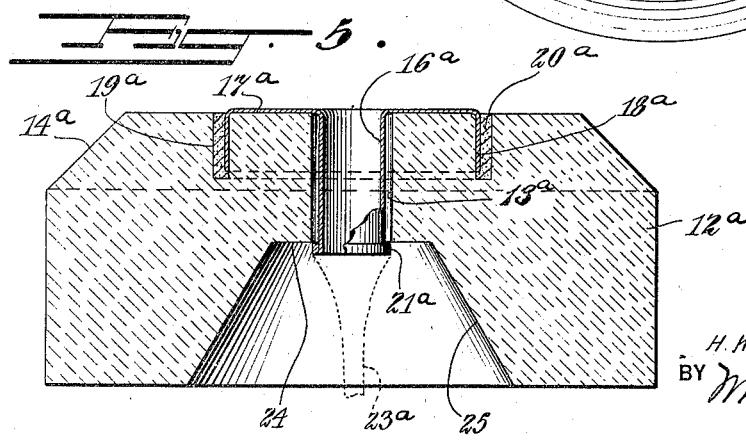
INVENTOR
H. K. RICHARDSON
BY M. F. Reges
ATTORNEY Patented Feb. 13, 1940

2,190,296

UNITED STATES PATENT OFFICE 2,190,296

GUIDE FOR MOLTEN MATERIAL

Henry K. Richardson, Bloomfield, N. J., assignor, by direct and mesne assignments, of one-half to Westinghouse Electric & Manufacturing Company, East Pittsburgh, Pa., a corporation of Pennsylvania, and one-half to Baker and Co., Inc., Newark, N. J., a corporation of New Jersey Application August 27, 1938, Serial No. 227,170

21 Claims. (Cl. 49—55)

This application is a continuation-in-part of my copending applications, Serial No. 645,190, filed December 1, 1932, and Serial No. 18,983, filed April 30, 1935, and owned by the assignees of the present application.

This invention relates to glass furnaces and more particularly to an improved die or outlet orifice employed for the flowing of molten glass from such a furnace.

In the manufacture of certain articles wherein it is necessary to feed a molten material such as glass, difficulty has been encountered in providing a die or member with an outlet which would not vary in size by reason of the disintegration of the surface under the high temperature of the flowing material. The flow outlet of a glass furnace is an important part of the apparatus since, under certain conditions where it is necessary to feed a definite amount of glass to constitute a part of a device, it is obvious that when the dimensions of the outer orifice have been determined, any variation in such dimensions will cause a variation in the amount of glass fed to constitute the part being formed.

The invention, although applicable to various types of glass furnaces, is of particular importance in connection with a furnace from which glass is fed to form the insulating material in the base of an incandescent electric lamp. Heretofore it has been customary to feed the glass by passage through an aperture in a refractory die which usually consisted of glazed porcelain. Such dies began to wear shortly after they were put into use and it was found that after fifty or sixty hours of operation it was necessary to insert a refractory plug into the die to control the size of the stream, since the die would gradually wear away under the action of flowing heated material.

When using the term die in the present description and claims, it is to be construed as meaning a body of material having a passageway or aperture therethrough of a definite dimension to cause the flow of a given amount of material in a given time. The die may be in the form of an insert in the bottom wall of a container or receptacle for the molten glass or the wall may be of a refractory material having a passageway of a definite dimension.

It is an object of the present invention, therefore, to provide a glass furnace die which will maintain a definite dimension for a relatively long period of operating time.

Another object of the present invention is to provide a glass furnace die formed in a body of refractory material and having the effective die surface resistant to disintegration.

A further object of the invention is to provide a glass furnace die comprising a body having an accurate aperture, and in coating the surface of the aperture with a heat-resistant material.

Another object of the invention is to provide an outlet orifice having a protective liner of such construction as to minimize accumulation of foreign particles at the inlet end of the liner.

A further object of the invention is to provide an outlet orifice in a refractory body provided with a metallic refractory liner suspended in the orifice.

A still further object of the invention is to provide a protective metallic liner for a flow orifice so arranged and constructed as to be free to expand and contract under varying temperature conditions.

Another object of the invention is to provide a flow orifice for molten glass comprised of a body of low heat conductivity and a metallic protective wall within the orifice and disposed in spaced relation to the wall of the orifice.

Other objects and advantages will be more clearly understood from the following description together with the accompanying drawings in which:

Fig. 1 is a vertical sectional view of a glass furnace receptacle showing an outlet orifice member or die constructed in accordance with the present invention;

Fig. 2 is an enlarged vertical sectional view of the die portion of the furnace shown in Fig. 1;

Fig. 3 is a plan view of the die element.

Fig. 4 is a vertical sectional view corresponding to Fig. 1, but showing a modified form of die;

Fig. 5 is an enlarged vertical sectional view of the die shown in Fig. 4; and

Fig. 6 is a plan view of the die shown in Fig. 5.

In constructing a die in accordance with the present invention, I employ a refractory body having an outlet aperture or passage, and line said passage with a layer of metal of high melting point.

As shown in Fig. 1, a receptacle 10 for molten glass 11 may be provided with a refractory insert 12 of any suitable material of low heat conductivity, as for example Alundum. This insert is provided with a passageway 13 which is lined with a metallic layer 14 preferably in the form of a tubular insert 15 which is made to conform to the shape of the passageway and to snugly fit the same.

For the purpose of making the liner or metallic layer 14 removable, the refractory insert 12 may have the passageway 13 extending out of a cavity 16 and the insert may be provided with a flange 17 for disposition on the floor of the cavity. For the purpose of holding the insert more tightly in position, the flange 17 is provided with a ring 18 disposed in a groove 19 and an additional groove 20 is provided which may be filled with a cementitious material or packing to be pressed downwardly by a plug 21 which is disposed in the cavity and which engages the flange 17 to hold the liner 14 in place. The plug is provided with lugs 22 which enter bayonet slots 23 so that when the plug 21 is in place, it may be rotated and thus locked in position. With this construction an insert may be removed at any time and cleaned or a new liner may be substituted.

Figs. 4 to 6 show a modified form of the guide or die in which the inlet orifice of the liner leads directly from the molten glass and in which the liner is suspended in spaced relation to the wall of the outlet orifice.

As illustrated in Fig. 4 a receptacle or furnace 10$^a$ for molten glass 11$^a$ may be provided with a refractory body 12$^a$ of any suitable material of low heat conductivity as, for example, of Alundum. This insert may be provided with an outlet orifice or passageway 13$^a$.

In Figs. 1 to 3, the refractory body 12 is provided with a funnel shaped aperture leading to the outlet orifice whereas in Figs. 4 to 6 the body 12$^a$ may be in the form of a cylindrical block having its normal upper edge chamfered or bevelled as indicated by the numeral 14$^a$. The insert 12$^a$ may be so positioned with respect to the floor 15$^a$ of the furnace that the surface of the said floor lies in a plane intersecting the lower edge of the bevelled surface 14$^a$.

With this construction heavier particles of material such as metallic bodies or pieces of slag which settle at the bottom of the furnace will not flow into the die orifice by reason of the opposition presented by the inclined surface 14$^a$. The orifice 13$^a$ is, in accordance with the present invention, protected by a tubular liner 16$^a$ of an alloy such as platinum-rhodium having a flange 17$^a$ which rests upon the upper surface of the refractory insert 12$^a$, and a depending collar 18$^a$ is disposed in an annular slot 19$^a$ formed in the surface of the refractory element 12$^a$. The tubular insert may be dropped through the orifice and held by means of the flange and collar in a definite position with respect to the orifice within the refractory insert. A suitable cement 20$^a$ may be used to secure the sleeve against removal and to prevent leakage.

Inasmuch as the coefficients of expansion of the refractory insert 12$^a$ and the metallic sleeve 16$^a$ differ, the sleeve is made with its outside diameter slightly less than the inside diameter of the orifice 13$^a$, thus allowing for expansion when the protective liner is subjected to the high temperature of the molten glass.

The sleeve 16$^a$ is so constructed as to extend slightly below the lower end of the outlet orifice 13$^a$ and is provided with a reinforcement or thickened portion 21$^a$. This thickened portion serves to strengthen the free end of the tubular member 16$^a$ and at the same time prevents the flowing glass from creeping around the outlet end of the tube 16$^a$, thus avoiding an accumulation of glass between the liner and the refractory insert.

In accordance with the present invention, a glass furnace is provided with an outlet orifice for the passage of a glass stream 23$^a$ which, as shown, necks down as it leaves the outlet orifice. The tubular lining hangs free within the orifice 13$^a$ and extends below the surface 24 of a flared recess 25 formed on the under side of the insert 12$^a$. By reason of the particular alloy employed, the sleeve 16$^a$ may be made of a sheet of extremely thin material, as such having a thickness of about .030 of an inch, thus avoiding the transfer of heat from the glass stream which would otherwise lower the temperature thereof. The extreme thinness of the material used is made possible by the fact that platinum-rhodium resists wear under the abrasive action of the flowing glass at high temperature.

The tubular portion 16$^a$ of the liner member is, as above pointed out, provided at its lower end with a reinforcing collar 21$^a$. This collar may be made by disposing a ring of alloy about the end and welding or fusing it to the tube portion. This welding operation results in a solid collar of greater hardness than the sheet alloy of the tube.

The glass stream, as it leaves the tube 16$^a$, wets and spreads over the surface of the collar. If the end of the tube were flush with the surface 24 the glass would creep across the surface and build up in a solid mass or the glass, by reason of its capillary attraction, would travel up between the tube 16$^a$ and the wall of the passage 13$^a$ and eventually cause the tube to crack. By extending the tube below the surface 24 the stream is carried far enough away from this surface so that gravity overcomes the capillary force and the stream flows from the tube, as shown.

The reinforcing collar gives strength where needed to that portion of the tubular liner which is not backed up by the refractory body. The tube 16$^a$, as shown, is spaced from the refractory body when cold but when the glass reaches a temperature of about 1300 degrees centigrade, the liner therefor is heated to a high temperature and expands against the wall of the passage in the refractory body.

It will be noted that the diameter of the tubular liner is uniform throughout its length thus furnishing the smallest possible opening for the entrance of any foreign particles which might serve to obstruct the passage and, by reason of the flat surface provided across the top of the insert 12$^a$, any accumulation of solid particles about the mouth of the outlet may be easily removed by means of an instrument in the hands of an operator.

It has been found that although various metals having a high melting point may be used for making the layers or tubes 14 and 16$^a$, best results have been obtained by using an alloy of platinum. This alloy may be provided in the form of a sheet composed of approximately ten percent rhodium and ninety percent platinum. Platinum-iridium has been used but the platinum-rhodium alloy has proven more satisfactory. Good results have been had by using ten percent rhodium but greater percentages may be used. The sheet alloy may readily be drawn to the desired size and exact dimensions may be given to the outlet orifice.

By the use of a die surfaced with the metal as above described, practice has shown that after two thousand hours of operative use the outlet dimensions have been maintained. That is, the flowing of the material is kept constant and a machine, operating to intermittently deposit definite quantities of the molten material, performs its function without further attention to the die.

A die provided in accordance with the present invention furnishes, insofar as I am aware, the first positive means known for controlling the diameter of a glass stream and maintaining such diameter uniform over a long period of time without attention or necessary tampering with the die during its life. Heretofore, in the use of porcelain or other dies of refractory material, it was necessary to use a tapered plug as a valve to control the inlet orifice of the die which resulted in a constant variation in the flow, making it difficult to control the amount of glass passing through the die.

By reason of the present invention, it is possible to install on a glass furnace, as used for the manufacture of bases for incandescent electric lamps, an automatic means for controlling the glass stream temperature with respect to the automatic control of the heat supply to maintain a combustion condition in the glass furnace to keep the stream temperature at a predetermined point.

The invention, therefore, constitutes a decided advanced step in the glass working art and particularly in connection with the manufacture of bases for incandescent electric lamps where it is necessary to feed a predetermined amount of glass for each base. Glass for bases must necessarily be fed at a high rate of speed and at relatively low cost. The operative parts or machine elements, therefore, which function to produce these bases must necessarily operate without variation and without attention. In cases where it is necessary to continually maintain a given part, the cost of operation is increased, defeating certain gains in speed and cost in other steps during the process of manufacture.

As above mentioned, it is necessary to maintain a definite dimensioned outlet aperture. It is, however, also essential to maintain a definite temperature in the glass stream. When using metal for the surface it is found that the heat conductivity rate of the metal is high and carries away heat from the glass stream.

By making the surfaced passage of a relatively thin layer of metal, however, and by supporting the surface material on a body of a refractory material of relatively low heat conductivity, it is found that the glass stream temperature is maintained uniform which, when combined with the feature of maintaining the cross sectional area of the stream uniform, provides a decided advanced step, tending to more accurate and cheaper production.

It is obvious that the present die may be made to various forms and of different sizes, the size being governed by the volume of glass to be discharged per unit of time, the volume of glass being dependent upon its viscosity which changes with temperature and with its composition.

Although preferred forms of the invention are shown and described herein it is to be understood that modifications may be made therein without departing from the spirit and scope of the invention as set forth in the appended claims.

I claim:

1. A guide for flowing molten glass comprising a body of low heat conductivity, said body having a passage therethrough, a tubular metallic protective member disposed in and spaced from the wall of said passage, a flange integral with said member extending over the normal upper edge of said passage, an annular groove in said body surrounding said upper edge and a collar integral with said flange disposed in said groove.

2. A guide for flowing molten glass comprising a refractory body of low heat conductivity formed with a passage therethrough, and a tubular protective platinum-rhodium alloy member disposed in said passage, comprising a cylindrical portion spaced from the wall of said passage and a flange extending from the upper end of said cylindrical portion and overlying the normal upper edge of said wall, said body having an annular groove surrounding said upper edge and said protective member having a collar depending from the periphery of said flange and disposed in said groove.

3. A tubular platinum-rhodium alloy member adapted to serve as a protection for an aperture in a guide for molten glass, said member comprising a cylindrical portion, a flange extending from one end of said portion normal to the axis thereof, and a collar extending from the periphery of said flange in the same direction as said cylindrical portion.

4. A tubular protective platinum-rhodium alloy member, adapted to serve as a die for molten glass, comprising a cylindrical body portion, a flange extending from one end of said portion in a plane normal to the axis thereof, a collar extending from the periphery of said flange in the same direction as said cylindrical portion, and a reinforcing annulus on the other end of said body portion.

5. A guide for flowing molten glass comprising a refractory body having a generally cylindrical passage therethrough, a metallic protective member comprising a generally cylindrical portion coaxially disposed in said passage, and of smaller diameter so that it is spaced from the surface of said body defining the same, the normally upper end of said cylindrical portion being flanged outwardly and supported on the upper surface of said body, said body having an annular groove coaxially disposed with respect to and surrounding said passage, said flange being formed with a collar depending from its outer edge, disposed in said groove, and engaging the inner groove-defining surface of said body, in order to center said member.

6. A feeder guide for a glass furnace comprising a refractory body of low heat conductivity, said body having a passage for liquid glass, and a protective lining of platinum-rhodium alloy disposed in and spaced, as a single thickness, from the wall of said passage to permit said lining to expand and contract independently of said wall when heated by said glass.

7. A feeder guide for a glass furnace comprising a refractory body of low heat conductivity extending above the floor of said furnace, said body having a passage and a single thickness platinum-rhodium alloy lining disposed in, and in spaced relation to the wall of said passage, for the free expansion of said lining when heated.

8. A guide for flowing molten material comprising a body of low heat conductivity, said body having a passage and a lining of platinum-rhodium alloy suspended in said passage and spaced from the wall of said passage for free expansion when heated to a normal maximum working temperature to contact with the wall of said passage.

9. A guide for flowing molten material comprising a body of low heat conductivity, said body having a passage and a protective member composed of platinum-rhodium alloy having a tubular portion disposed in the passage, spaced from the surface of said body defining said passage, and forming a single thickness lining, a flange integral with said tubular portion disposed about the normal upper edge of said passage, said tubular portion being suspended by said flange in said passage.

10. A guide for flowing molten material comprising a refractory body of low heat conductivity having a passage therethrough and a portion surrounding said passage, a refractory metallic member having a flange resting on the surface surrounding the inlet end of said passage and formed with a collar depending from its outer edge, said collar telescoping with and engaging said portion to center said metallic member with respect to said refractory body, and a tubular member of single wall thickness disposed in, and of smaller diameter than, said passage, suspended from said flange, and spaced by said collar from the surface of said body defining said passage.

11. A feeder guide for a glass furnace comprising a refractory body of low heat conductivity, a passage extending through said body, a tubular single thickness platinum-rhodium lining for said passage, means for securing said lining in said passage in spaced relation to the wall thereof for free expansion against said wall, said lining extending beyond the normal outlet end of said passage.

12. A feeder guide for a glass furnace comprising a refractory body of low heat conductivity, a passage extending through said body, a platinum-rhodium tubular lining for said passage, means for securing said lining in said passage in spaced relation to the wall thereof for free expansion throughout a working range of temperature to contact against said wall, said lining extending beyond the normal outlet end of said passage, and a reinforcing annulus on the extension.

13. A die for a glass furnace comprising an insert of low heat conductivity having a cavity, and a passage for the flow of molten glass leading from said cavity, a removable lining of a high melting point metal in said passage, a flange on said lining disposed in contact with the bottom of said cavity, and a removable plug for holding said lining against endwise movement.

14. A die for the passage of molten material comprising a body having a passage for the flow of molten material, a tubular lining of high melting point, a flange integral with the tubular lining extending over one edge of said passage, and means engaging said flange to hold the lining against relative movement in said passage.

15. A die for the passage of molten material comprising a body having a passage for the flow of molten material therethrough, a tubular lining of high melting point for said passage, a flange integral with the tubular lining extending over one edge of said passage, said body having a groove surrounding said flange, an annulus integral with said flange and disposed in said groove, and means engaging said annulus for holding said lining against relative movement.

16. A die for the passage of molten material comprising a body having a passage for the flow of molten material therethrough, a tubular lining of high melting point for said passage, a flange integral with said lining extending over and protecting the edge of said passage at one end, and means engaging said flange to hold said lining against relative movement, said lining extending beyond the other end of said passage to protect the edge thereof.

17. A die for molten material comprising a refractory body having a tubular passage with a normally vertical axis, for the flow of said material, and a one-piece correspondingly shaped member, formed from a sheet of platinum-rhodium alloy, lining said passage, extending from said body and having a flange formed from said sheet and normally engaging a normally horizontal surface on said body for holding said member in said passage.

18. A die for the passage of molten material comprising a heat-insulating refractory body having a passage for the flow of said material, a tubular member of sheet platinum-rhodium alloy lining said passage, extending from said body to provide a wear-resisting nozzle for said molten material, and having a flange formed from said sheet extending exteriorly of said member adjacent to an end thereof opposite to said nozzle, and means engaging said flange for holding said tubular member in position.

19. A glass furnace comprising a tank made of heat-insulative material to hold a quantity of molten glass, said tank having an outlet in the wall thereof for the gravity flow of a stream of said molten glass, a sheet metal member having one end extending from and aligned with said outlet to serve as a discharge nozzle for said molten glass, a flange formed from said sheet at the other end of said member, and means engaging said flange to hold said member in place.

20. A die for molten glass comprising a refractory body having a passage therethrough for the flow of said glass, and a one-piece tubular member formed of platinum-rhodium alloy, and having a flange extending from one end thereof and overlying an upper face of said refractory body, for holding said member in place in said passage.

21. A die for molten glass comprising a refractory body having a passage therethrough for the flow of said glass and having a conical surface extending downwardly and outwardly from its upper surface, and a one-piece cylindrical protective member formed of an alloy of platinum and rhodium, mounted coaxially with said passage and having a flange extending from its upper end and supported on a part of said body, beneath said upper surface, for holding said member in place.

HENRY K. RICHARDSON.